United States Patent [19]
Süssmuth

[11] 3,973,861
[45] Aug. 10, 1976

[54] DEBURRING TOOL
[75] Inventor: Reiner W. Süssmuth, Neu Isenburg, Germany
[73] Assignee: Amtel, Inc., Providence, R.I.
[22] Filed: Feb. 12, 1975
[21] Appl. No.: 549,326

[30] Foreign Application Priority Data
Feb. 15, 1974 Germany............................ 2407269

[52] U.S. Cl................................ 408/154; 408/227; 408/713; 408/714
[51] Int. Cl.²........................................ B23D 77/02
[58] Field of Search ........... 408/116, 147, 154, 155, 408/156, 157, 181, 231, 233, 227, 228, 182, 239, 713, 714

[56] References Cited
UNITED STATES PATENTS
| | | | |
|---|---|---|---|
| 1,635,103 | 7/1927 | Welsby | 408/714 X |
| 2,066,389 | 1/1937 | Blazek et al. | 408/116 |
| 3,345,888 | 10/1967 | Gustkey | 408/714 X |

Primary Examiner—Travis S. McGehee
Attorney, Agent, or Firm—Barlow & Barlow

[57] ABSTRACT

A cylindrical deburring tool is provided with a diametric guide slot extending through the body with a pair of cutter blades received in said guide slot for radial displacement therein and spring-biased apart to a position determined by an adjustable abutment means acting on each blade.

3 Claims, 4 Drawing Figures

DEBURRING TOOL

BACKGROUND OF THE INVENTION

This invention relates to a deburring tool and more particularly a tool for machining the opening rims of bores which embodies a shaft and a cutter that radially protrudes from the shaft. In the deburring tool art it is known to provide a cutter body having a rockable cutter therein which is spring urged outwardly so as to protrude from a slot in the tool body. Such a type of tool is shown in U.S. Pat. No. 2,895,356. Another form of deburring tool that is known in the art and one which has diametrically opposed cutters is shown, for example, in U.S. Pat. No. 3,661,473. In this type of tool the tool part is longitudinally slit so that the cutting portions which are generally made part of the outer end of the tool may have some outward resiliency due to the spring action of the resulting fork-like end. It has been found that there are some difficulties with the first type of device particularly since it is relatively complicated and difficult to manufacture and further the recess in the shaft which receives the cutter and the pivoting shaft or axle upon which the cutter must rotate become difficult to manufacture and replacement of a worn cutter is complicated. In the second form of known deburring type tools the tool is suitable only for relatively small bore diameters since the resilient parts of the shaft formed by the fork or longitudinal slot structure tend to set up vibrations, and if strengthening is provided, then the two portions are not adequately resilient. Further since the cutting blades are integral with the head end of the tool and the fork limbs, there is no interchangeability of cutting edges and the tool body must effectively be re-ground when there is difficulty experienced. The instant invention provides a simpler tool which obviates the aforementioned difficulties and which is particularly suitable for large bore diameters.

SUMMARY OF THE INVENTION

The instant invention provides a deburring tool in which the cutter body protrudes from a diametric guide slot in the body and comprises a pair of cutter blades which are radially displaceable and are urged outwardly by a spring means which, for example, can be a simple helical compression spring. The guidance of the cutter body can be kept relatively simple by utilizing a four-cornered or alternately a cylindrical body in order to retain firm retention of the cutter body within the tool body itself, and in this way vibrations of the cutter are completely avoided, and further large forces can be exerted by the tool and exchangeability of worn cutters is readily provided.

DESCRIPTION OF THE PREFERRED EMBODIMENT

Figure 1:
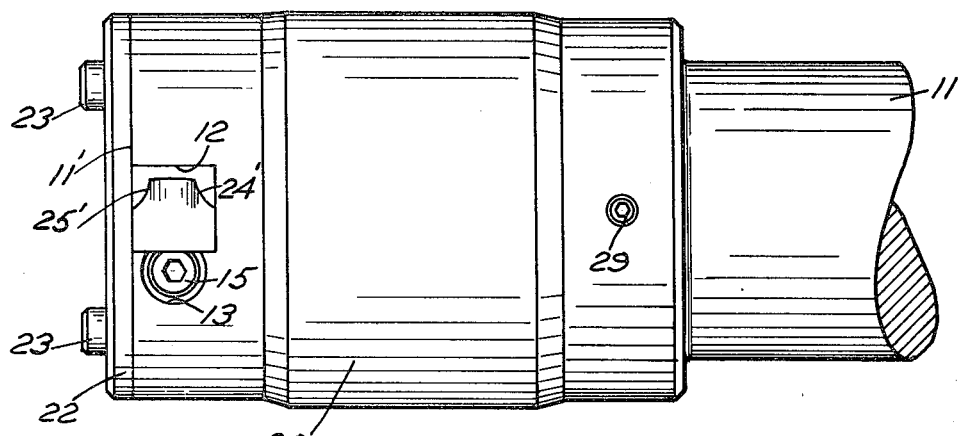
FIG. 1 is a side elevational view of the tool made in accordance with the invention.

The deburring tool comprises a shaft 11 which has formed at the end thereof a guide slot 12. Adjacent to the guide slot 12 from opposite ends thereof and bores 13, 13' so that there is an opening between these bores and the guide slot 12. At the bottom of each of the bores 13 is a smaller threaded bore 14, 14' which is adapted to receive a headed screw with a threaded stem which screw is designated 15 and 15'. The heads of these screws protrude laterally through the opening into the guide slot 12 for a purpose which will presently be described. Each of the screws 15 particularly the threaded shanks thereof are adapted to be locked in place by a deformable pressure pad 17, 17' and a set screw 16, 16' which are located in bores that intersect the threaded bores 14, 14'.

Figure 3:
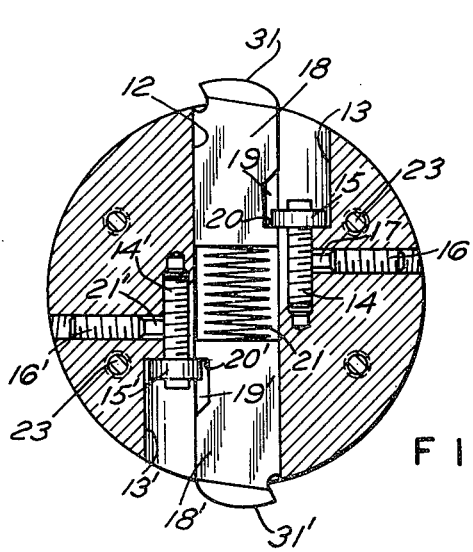
FIG. 3 is a sectional view taken on lines 3—3 of FIG. 2.

Two cutter blades with a cross section adapted to the shape of the guide slot 12 and designated 18 and 18' are provided with a groove respectively 19 and 19' which has an end wall 20 and 20' respectively. By referring to FIG. 3 it will be seen that the arrangement is such that when the cutter blades are properly inserted into their respective guide slots that the head of the set screw engages in the grooves 19 and 19' and the underside of these set screw heads 15 will abut the walls 20 and 20' respectively. This means that the set screw heads 15 and 15' limit the amount of outward radial movement of the cutter blades which are urged in a radially outward direction by a spring 21.

Figure 2:
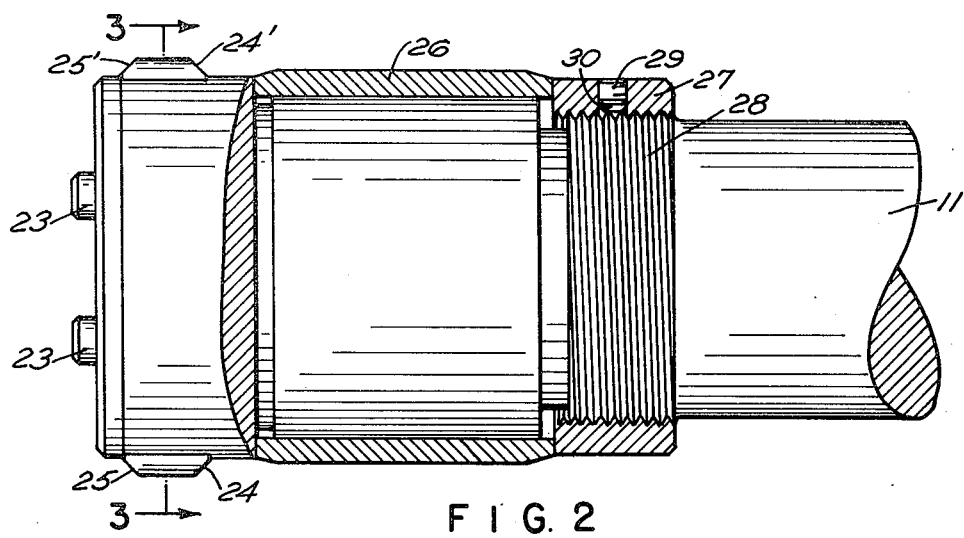
FIG. 2 is a partial sectional view of the tool of the invention taken from the top thereof.

As will be seen by referring to FIG. 1, the guide slot 12 opens to the face 11' of the shaft 11. It will be apparent that the cutter blades 18, 18' may be arranged in the guide slot 12 through the end face 11' of the shaft 11 along with the spring means 21. In this position when the parts are properly assembled and the set screws 15, 15' are in place, a cover plate 22 may be placed over the end 11' of the shaft 11 and fastened into place by fastening screws 23. The cover plate 22 together with the guide slot 12 forms a complete guide recess for the cutter blades 18, 18'. As will be seen particularly by referring to FIG. 2, the cutter blades are preferably formed with a pair of cutting edges 24, 25 at the protruding ends of the bodies thereof, and these edges are inclined or at an angle to the general longitudinal extent of the cutter blades.

Surrounding the shaft 11 is a bushing 26 which is preferably made of a soft material such as bronze, and this bushing is secured to the shaft by a threaded ring 27 which is received on the threads 28 of the shaft 11. The threaded ring 27 may be secured from rotation about the threads by means of a set screw 29, and a soft pressure pad 30.

The deburring tool may be employed for entrance and exit deburring of bores. For this purpose the shaft 11 may be suitably clamped into a driving machine (not shown) which will effect the advance of the tool in one or the other of the axial directions of the shaft 11 and will further rotate the shaft 11. During a forward advance to the left as seen in the drawings, the cutter blades 18, 18' by their cutting edges 25, 25' will impact against the forward opening rim of the workpiece bore and deburr it as the shaft 11 rotates. It will be noted that the cutting edges 25, 25' are inclined against the direction of advance, and therefore, during further advance the pressure against these edges will be sufficient to force the cutter blades inwardly against the force of the spring 21 until the tool slides into the workpiece bore. The tool will thereupon traverse the workpiece bore and since the cutter blades are provided with rounded off end faces as at 31, 31' (see FIG. 3), they will merely rest under the pressure of the spring 21 against the inside of the workpiece bore without processing the same or in any way bothering the machine finish created therein. At the end of the workpiece bore with continued advance the cutter blades will again spring out of the recess 12 to the limit as adjusted by the heads 15, 15' of the set screws. In this way during the reverse run of the tool to the right as seen in the drawing, the cutting edges 24, 24' will engage the exit end of the workpiece bore and deburr the same.

It will be apparent that by merely removing the cover plate 22 the cutter blades 18, 18' can be exchanged and replaced or different length cutter blades may be inserted therein for deburring larger bore diameters. In the case of larger bore diameters the guide bushing 26 would also be removed and replaced with a larger bushing which corresponds to the larger workpiece bore diameter to be processed.

Figure 4:
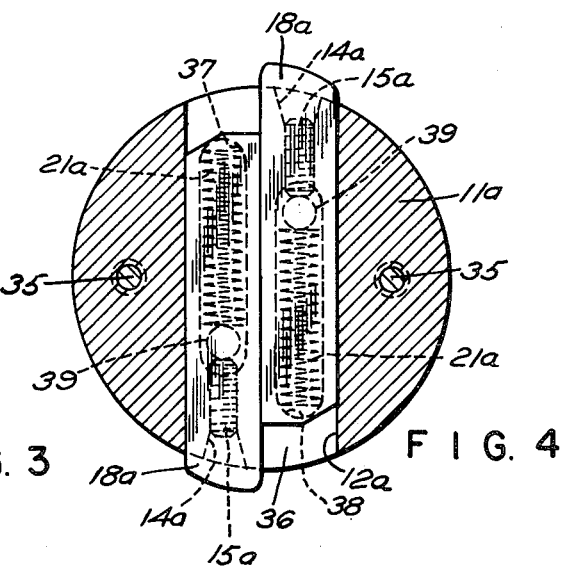
FIG. 4 is a sectional view of a modified form of tool made in accordance with the invention taken in the same position as the showing of FIG. 3.

Referring to FIG. 4 there is shown in a sectional view a modified form of tool from that illustrated in the previous figures. In this case the shaft 11a has a guide slot 12a formed at the end thereof opening outwardly to the end face of the shaft, as in the previous embodiments, and has provision for a cover plate, such as 22, being secured thereon by fasteners received in the threaded holes 35. A pair of recesses 37, 38 open to the bottom wall 36 of slot 12a and aligned with the central section of the recesses and below the bottom wall 36, are a pair of threaded bores 14a. In the threaded bores 14a is received a screw 15a and located within the recesses 37, 38 are spring means 21a. The two cutter blades which are received in the slot 12a and which are designated 18a, each have protruding therefrom a stud 39 and, as will be seen by referring to FIG. 4, the spring means 21a bear against one end of the wall of the recesses 37, 38 and also against the stud 39 located on each of the cutter blades 18a. The spring forces each of the cutter blades radially outward to a position limited by the stud 39 engaging the screw 15a. It will thus be seen that this arrangement operates in exactly the same fashion as the arrangement disclosed above, the deburring tools being resiliently held radially outward against the stop means by spring means.

I claim:

1. A deburring tool having a cylindrical body, a guide slot extending diametrically across the body, a pair of cutter blades having cutting edges received in line in said slot, said blades being radially outward and inward displaceable, spring means acting between the blades to displace them radially outward, each blade having abutment means thereon for engagement with means in said body to limit the outward displacement of the blades.

2. A deburring tool as in claim 1 wherein the abutment means comprises a groove in each blade having an end wall and an adjustable screw with an enlarged head against which the screw head engages.

3. A deburring tool having a cylindrical body, a guide slot extending diametrically across the body, a pair of cutter blades having cutting edges received in side by side relationship in said slot, said blades being radially outward and inward displaceable, spring means acting on each blade to displace each blade radially outward and abutment means on each blade and acting on a portion of the guide slot to permit the outward displacement of each blade.

* * * * *